US005949581A

United States Patent [19]

Kurtenbach et al.

[11] Patent Number: 5,949,581

[45] Date of Patent: Sep. 7, 1999

[54] DISPLAY SYSTEM

[75] Inventors: Reece A. Kurtenbach; Robert James Lutz; Robert E. Seeley; Brett David Wendler, all of Brookings, S. Dak.

[73] Assignee: Daktronics, Inc., Brookings, S. Dak.

[21] Appl. No.: 08/909,761

[22] Filed: Aug. 12, 1997

[51] Int. Cl.[6] .......... G02B 27/10

[52] U.S. Cl. .......... 359/621; 359/619; 359/623

[58] Field of Search .......... 359/619, 621, 359/623, 720, 737, 738, 742, 743, 797; 362/16, 240, 244

[56] References Cited

U.S. PATENT DOCUMENTS

| | | | |
|---|---|---|---|
| D. 214,939 | 8/1969 | Arrigoni | D48/16 |
| 3,228,288 | 1/1966 | Marien | 340/383 |
| 4,234,906 | 11/1980 | Schindler | 362/16 |
| 4,254,453 | 3/1981 | Mouyard et al. | 362/240 |
| 4,591,954 | 5/1986 | Kawamura et al. | 362/61 |
| 5,321,417 | 6/1994 | Voelzke et al. | 345/32 |
| 5,408,395 | 4/1995 | Schmid et al. | 362/240 |
| 5,490,049 | 2/1996 | Montalan et al. | 362/240 |
| 5,497,269 | 3/1996 | Gal | 359/615 |
| 5,655,830 | 8/1997 | Ruskouski | 362/240 |

*Primary Examiner*—Georgia Epps
*Assistant Examiner*—Michael A Lucas
*Attorney, Agent, or Firm*—Hugh D. Jaeger

[57] ABSTRACT

Modular display system having LED pixels and lenses aligned to the LED's to increase intensity, increase view angle and increase overall viewability. Louvers align along the LED's and lenses to shade the LED's and lenses from ambient light to increase viewability. Modular display panels which contain the LED's, lenses, louvers and other associated components are accessible from the front and back for changeover or repair.

5 Claims, 17 Drawing Sheets

DISPLAY SYSTEM

BACKGROUND OF THE INVENTION

1. Field of the Invention—The present invention is for a display system, and more particularly, pertains to a display system having maintenance accessibility and incorporating LED pixels, lenses, and louvers incorporated into one or more modular display panels to present an electronic display.

2. Description of the Prior Art—Prior art electronic display systems oftentimes lacked in brilliance and contrast. A solution to these deficiencies called for an increase in power to try to compensate for lack of brilliance or contrast, such solution often incurring extra required electrical energy, an economic drawback, and additional generation of heat. Along with larger electrical power requirements and heat generation came the need for more heavily constructed components, also an economic drawback. Prior art display systems also provided systems which had poor access for maintenance in that accessibility was limited to one side of the system. Such accessibility required that numerous fasteners be removed for the separation of layered component members to gain access to components interior to the display. Clearly what is needed is a method of increasing brilliance, contrast and viewability without increasing cost, material size and electrical consumption while offering readily accessed components for maintenance or component replacement.

SUMMARY OF THE INVENTION

The general purpose of the present invention is to provide an improved outdoor display system.

According to embodiments of the present invention, there is provided a display system, which can be used for indoor or outdoor applications, including one or more modular display panels in which a circuit board having a matrix of various colored LED pixels is mounted in a housing. Also included in the modular display panels are lenses which align over and secure over and about the colored LED pixels to direct, focus, refract or otherwise alter light emitted from the LED pixels for suitable enhanced viewing. Horizontally aligned louvers are interspersed with the LED pixels and lenses to shade the LED pixels and lenses from ambient light, thereby improving the view contrast and viewability. Each modular display panel secures to one or more module support members by quick connect latches. A driver board and a power supply also secure to the modular display panel by twist-on fasteners. Accessibility is provided to both sides of the display system by the use of the quick connect latches, which can be actuated form the front or rear for removal of the housing and attached members, and by readily removable circuit boards and louver panels.

One significant aspect and feature of the present invention is a display system which includes modular display panels.

Another significant aspect and feature of the present invention is a display system having a pixel lens aligned to an LED pixel to increase display brilliance and viewability.

A further significant aspect and feature of the present invention is the use of louvers to shield the LED pixel and lenses from ambient light, thereby increasing the display contrast.

Another significant aspect and feature of the present invention is the use of one or more support members which accept latch mounted components such as a modular display panel having a housing, a driver board, a power supply, and a printed circuit board having LED's, lenses and louvers.

Another significant aspect and feature of the present invention is the use of PC boards and louver panels secured to the front of a housing which quickly and readily mounts.

Yet another significant aspect and feature of the present invention is a latch system incorporated in a modular display panel which is accessible at the front and back of the modular display panel.

Having thus described embodiments of the present invention, it is the principal object of the present invention to provide a display system having sufficient brilliance and contrast and which is easily accessed and maintained.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
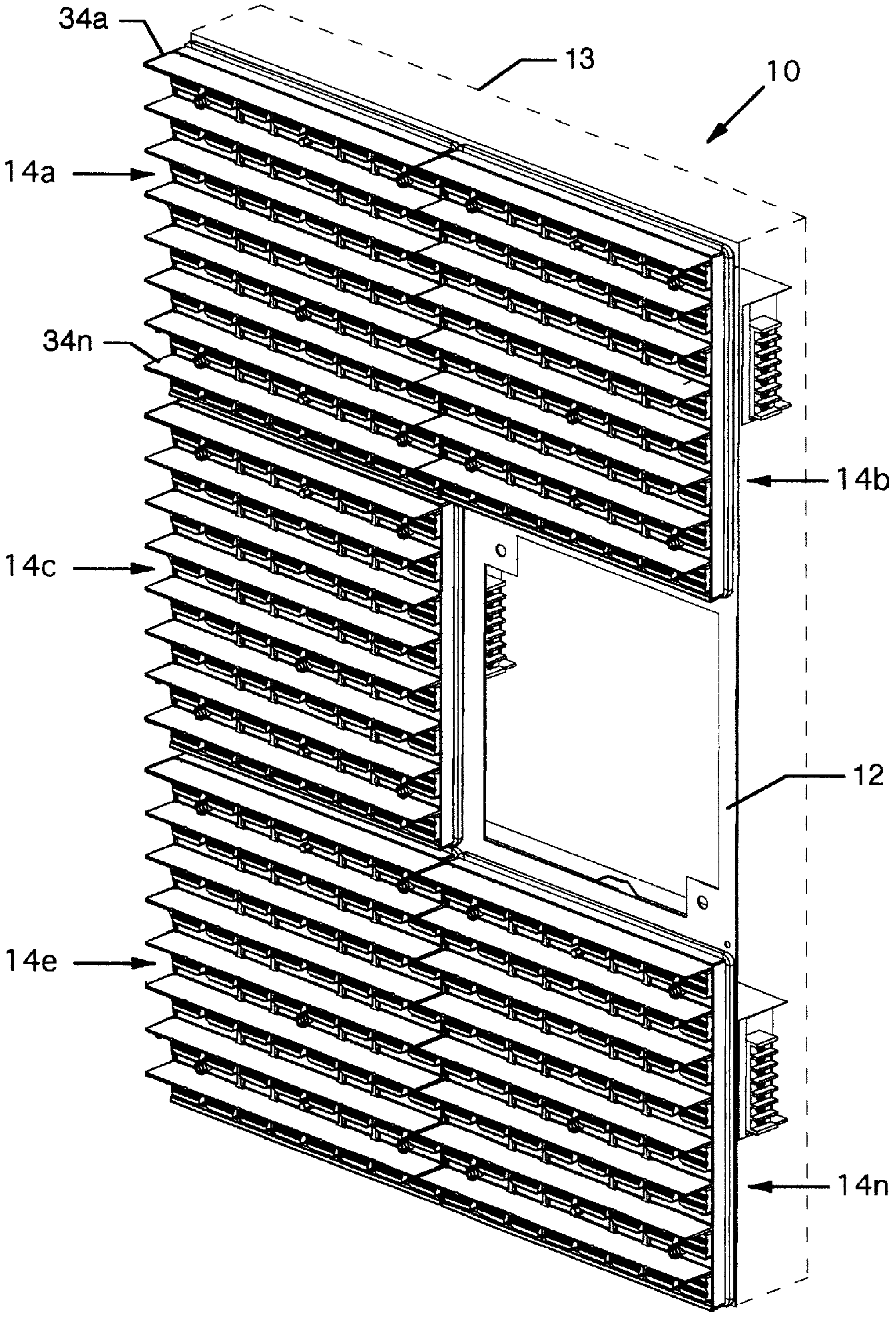
FIG. 1 illustrates an isometric view of the front side of a display system.

FIG. 1 illustrates an isometric view of the front side of an display system 10, the present invention, including a module mounting panel 12 upon which a plurality of readily accessed modular display panels 14*a*–14*n* are mounted. One of the modular display panels (to the right of modular display panel 14*c*) is not illustrated to reveal module mounting panel 12. The module mounting panel 12 with mounted modular display panels 14*a*–14*n* secures to a waterproof enclosure 13, shown in dashed lines. Some of the components for the modular display panels 14*a*–14*n* are a housing, electronic circuitry for the illumination of LED pixels, lenses aligned over and about the LED pixels, and horizontally aligned louvers 34a–34n for the shielding of the LED pixels and corresponding aligned lenses, as later described in detail.

Figure 2:
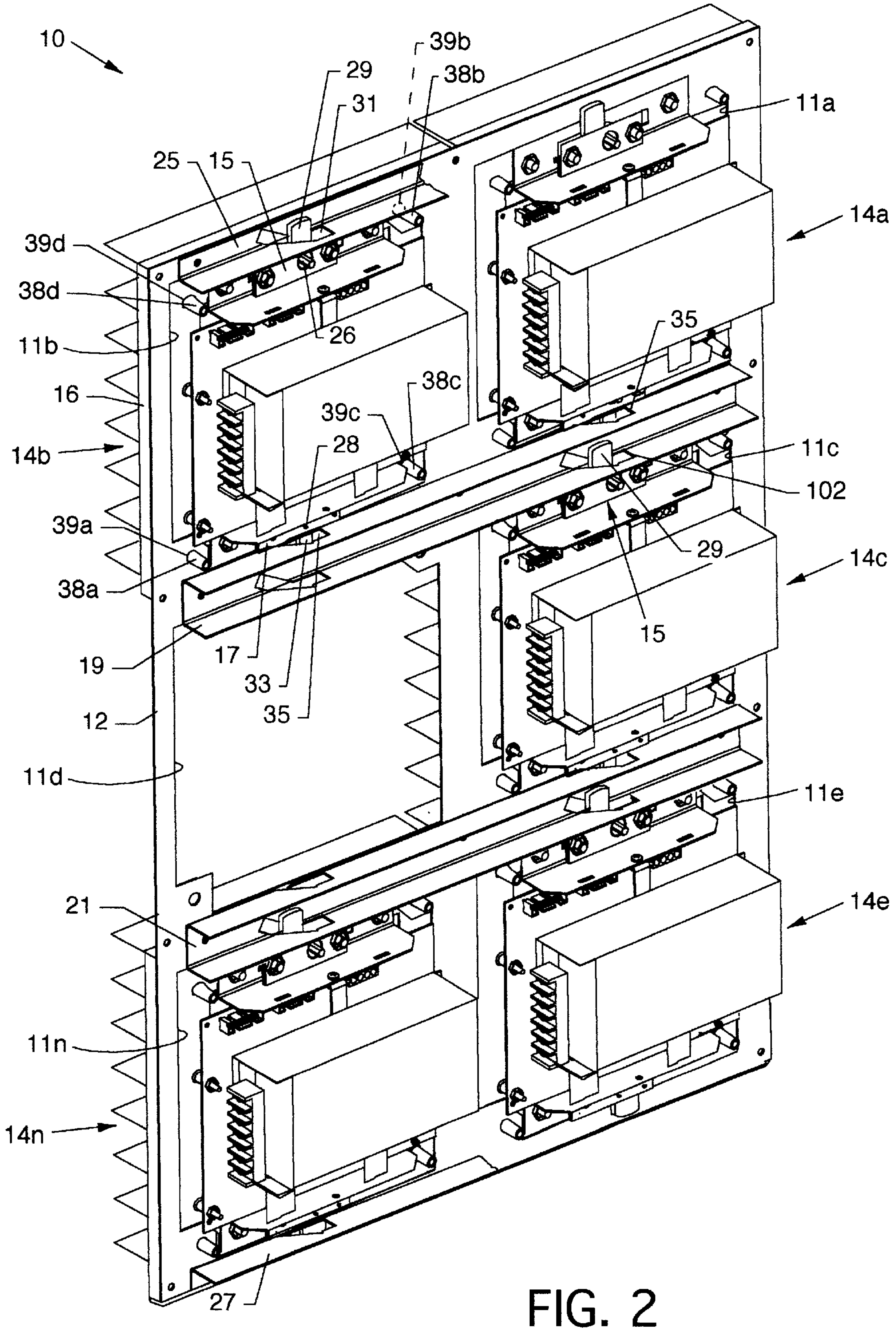
FIG. 2 illustrates an isometric view of the back side of the display system.

FIG. 2 illustrates an isometric view of the back side of the display system 10, where all numerals correspond to those elements previously described. The module mounting panel 12 includes a plurality of cutout areas 11a–11n. Illustrated modular display panels 14a, 14b, 14c, 14e and 14n align to the front surface of the module mounting panel 12 and extend in part through the cutout areas 11a, 11b, 11c, 11e and 11n. Of course, another modular display panel, not illustrated, would also align to the front surface of the module mounting panel 12 and extend in part through the cutout area 11d. Each of the modular display panels 14a–14n includes an attached upper latch assembly 15 and an attached lower latch assembly 17 which engage a slot either in a U-shaped member such as horizontally aligned U-shaped members 19 and 21 or in an L-shaped angle member such as horizontally aligned upper and lower L-shaped angle members 25 and 27, shown in partial view. For example and illustration and with respect to the modular display panel 14b, a latch 29 in the upper latch assembly 15 is illustrated engaging a slot 31 in the L-shaped angle member 25, and a latch 33 in the lower latch assembly 17 is illustrated engaging a slot 35 in the upper planar portion of the U-shaped member 19 to secure the modular display panel 14b to the module mounting panel 12. Latches 29 and 33 can be accessed and actuated from either the front or the rear of the modular display panel 14b, as later described in detail. Although U-shaped members 19 and 21 and L-shaped angle members 25 and 27 are described, other geometric configurations can be used to provide slots 31 and 35 for latching with latches 29 and 33 and shall not be construed to be limiting to the scope of the invention. In the alternative, the latches could also be configured to bear against the planar surfaces of the module mounting panel 12 in lieu of the incorporation of U-shaped members 19 and 21 and L-shaped angle members 25 and 27. Gravity pegs 38a–38d extend from the housing 16 through holes 39a–39b in the module mounting panel 12 to align the modular display panel 14b to the module mounting panel 12.

Figure 3:
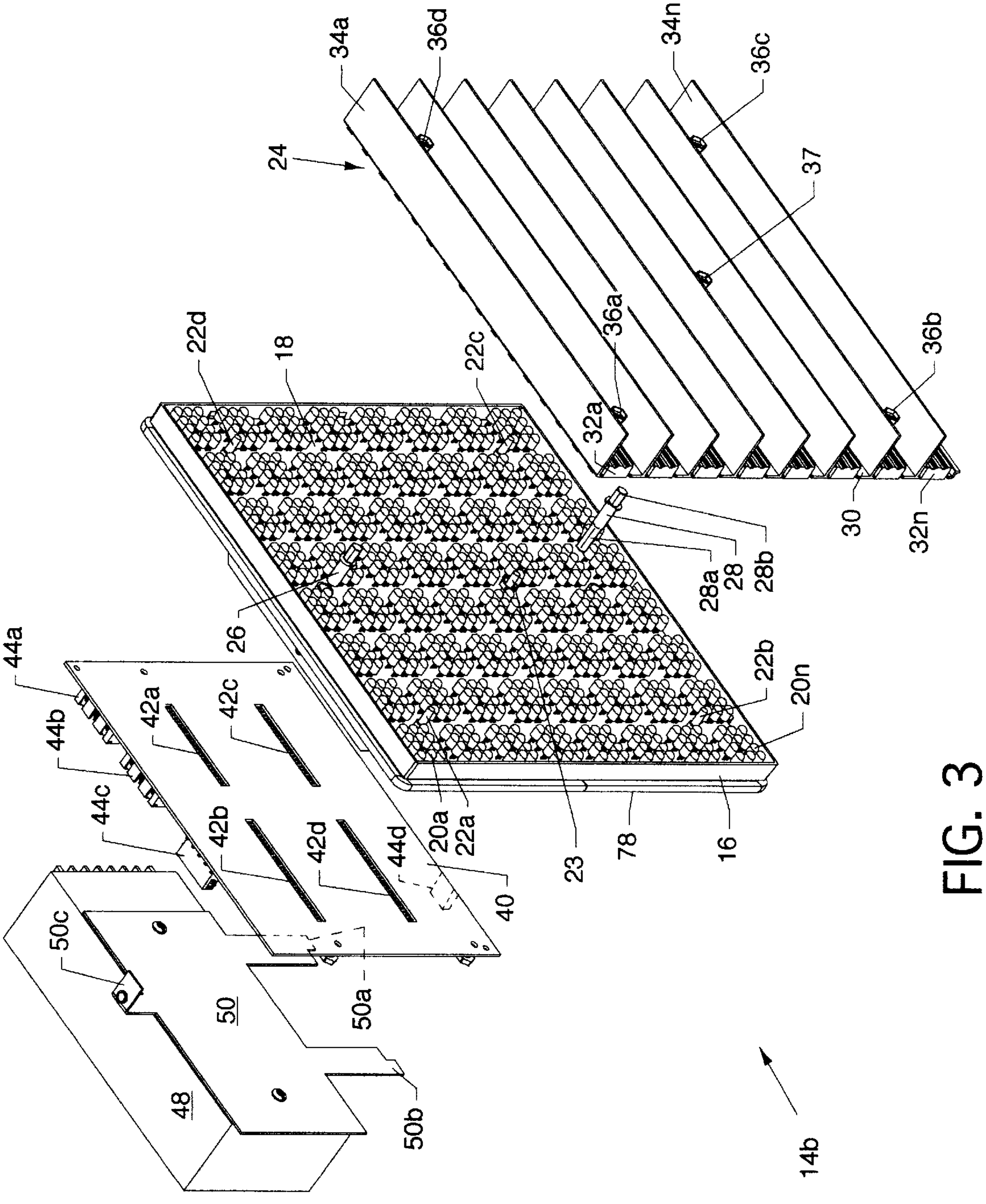
FIG. 3 illustrates a semi-exploded isometric view of a modular display panel from the front.
Figure 6:
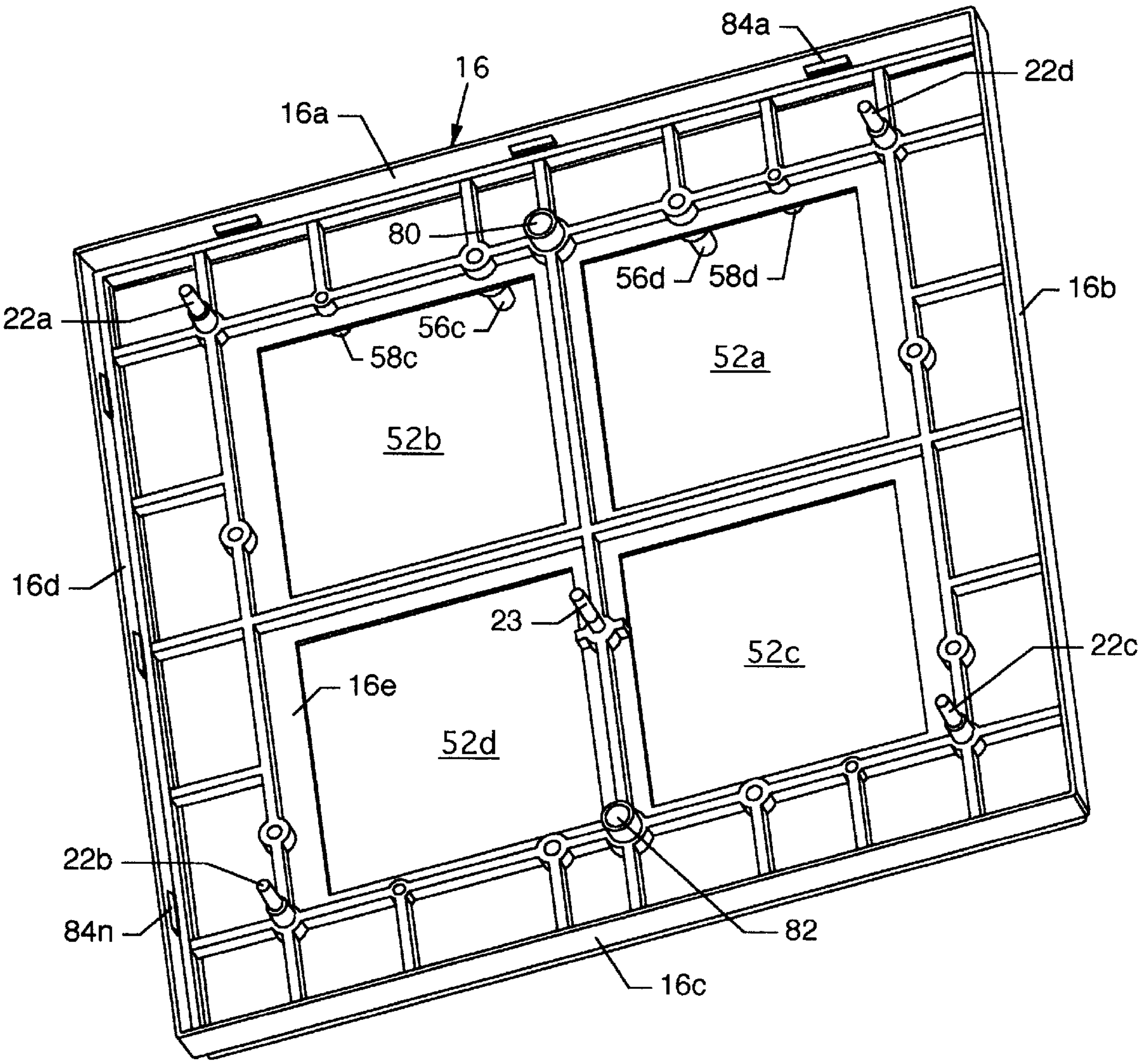
FIG. 6 illustrates a front isometric view of a housing.

FIG. 3 illustrates an isometric semi-exploded view from the front of a modular display panel 14b including a centrally located configured housing 16 to which a variety of components or other members secure. A printed circuit board 18 including a plurality of mounted and partially potted LED pixels 20a–20n aligns and secures to the housing 16. Each pixel 20a–20n is, for the purpose of example and illustration, comprised of various colored LED's in four columns of three LED's. A plurality of louver mounting posts 22a–22d, as also illustrated in FIG. 6, extend from the housing 16 and through the printed circuit board 18 and extend further through a one-piece molded louver panel 24. A printed circuit board and louver mounting post 23 also extends from the mid-portion of the housing 16 and through the printed circuit board 18. Also aligned to the housing 16 and extending thorough printed circuit board 18 are rotatable upper and lower latch access plugs 26 and 28 having hexagonal actuation ends. The lower latch access plug rear hexagonal end 28a extends through the housing 16 and printed circuit board 18 to be accessible from the rear of the housing 16, and the lower latch access plug front hexagonal end 28b extends through the louver panel 24 and is accessible from the front of the louver panel 24 as later described in detail. The rotatable latch access plugs 26 and 28 are similar in design and aid in waterproofing of the modular display panel 14b. The louver panel 24 includes a rear panel 30 having a plurality of receptacle holes in which a plurality of pixel lenses 32a–32n are snappingly engaged. The pixel lenses 32a–32n align over and about the LED pixels 20a–20n, mounted on printed circuit board 18, to direct, focus, refract, or otherwise alter the light emitted from the LED pixels 20a–20n for enhanced viewing. Horizontally aligned planar louvers 34a–34n extend outwardly from the rear panel 30 of the louver panel 24 to align to and extend horizontally along the top of the pixel lenses 32a–32n to provide shielding of the LED pixels 20a–20n and pixel lenses 32a–32n from ambient sunlight or other illumination sources. Twist-on fasteners 36a–36d secure over and about the louver mounting posts 22a–22d, respectively, and twist-on fastener 37 secures over and about the printed circuit board and louver mounting post 23 to partially secure the printed circuit board 18 and fully secure the louver panel 24 to the housing 16. This securing process also aligns and secures the pixel lenses 32a–32n to the LED pixels 20a–20n. The twist-on fasteners 36a–36d and 37 allow for easy securing of the louver panel 24 and resident pixel lenses 32a–32n to the housing 16 and also allow for easy disassembly, if required. The upper and lower latch access plugs 26 and 28 are captured between the louver panel 24 and the housing 16. A driver board 40 carries a plurality of female pin connector strips 42a–42d which align, mate, and electrically connect to a plurality of male pin connector strips 46a–46d, respectively, on the back of the printed circuit board 18. The driver board 40 also carries a plurality of connector plug receptacles 44a–44d which align, mate and electrically connect to corresponding connectors (not shown) on the back of printed circuit board 18. A power supply 48 and a mounting bracket 50 are also supplied. The one-piece mounting bracket 50 includes mounting tangs 50a and 50b at its lower end and an angled mounting member 50c at its upper end.

Figure 4:
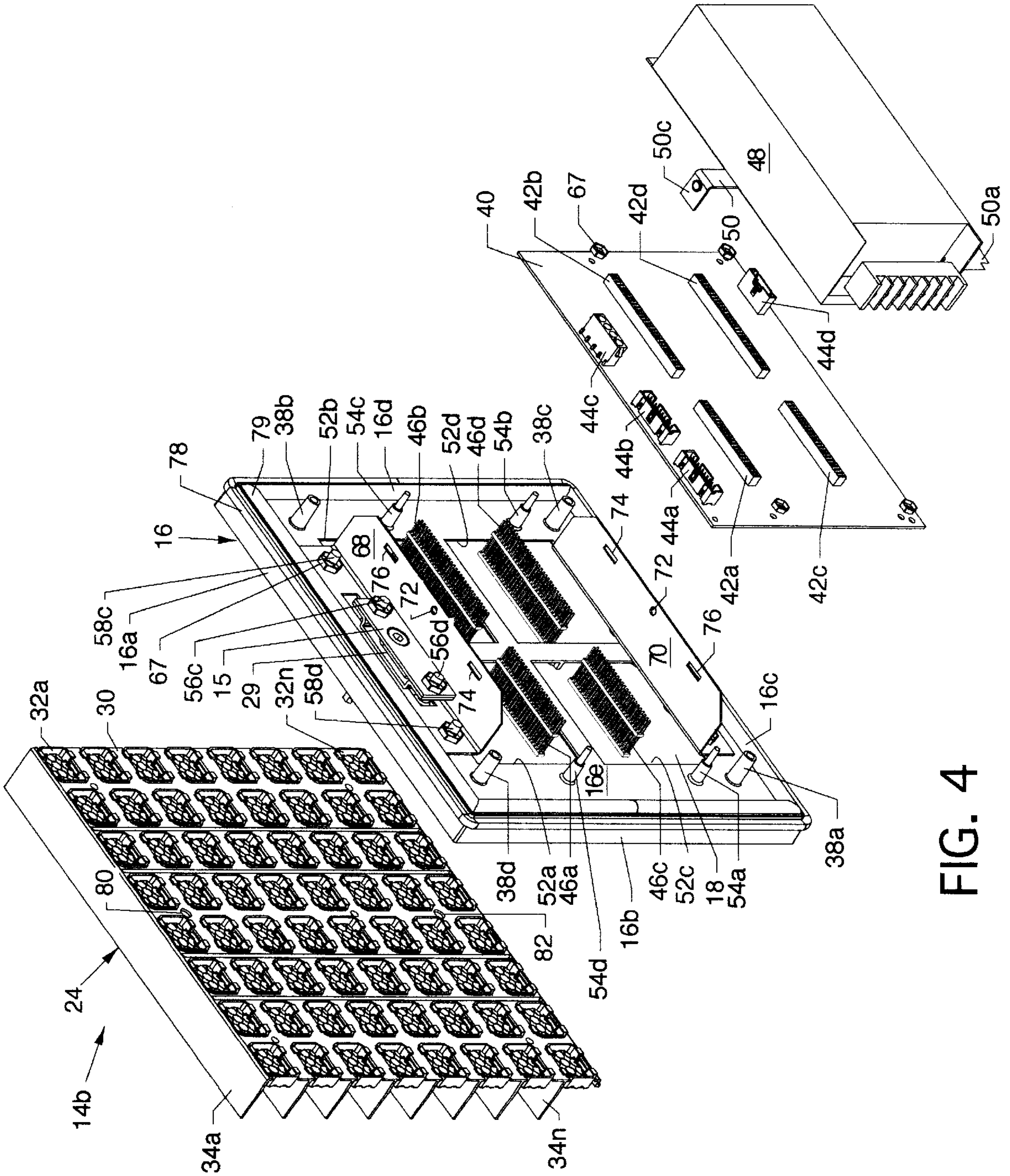
FIG. 4 illustrates a semi-exploded isometric view of a modular display panel from the rear.
Figure 8:
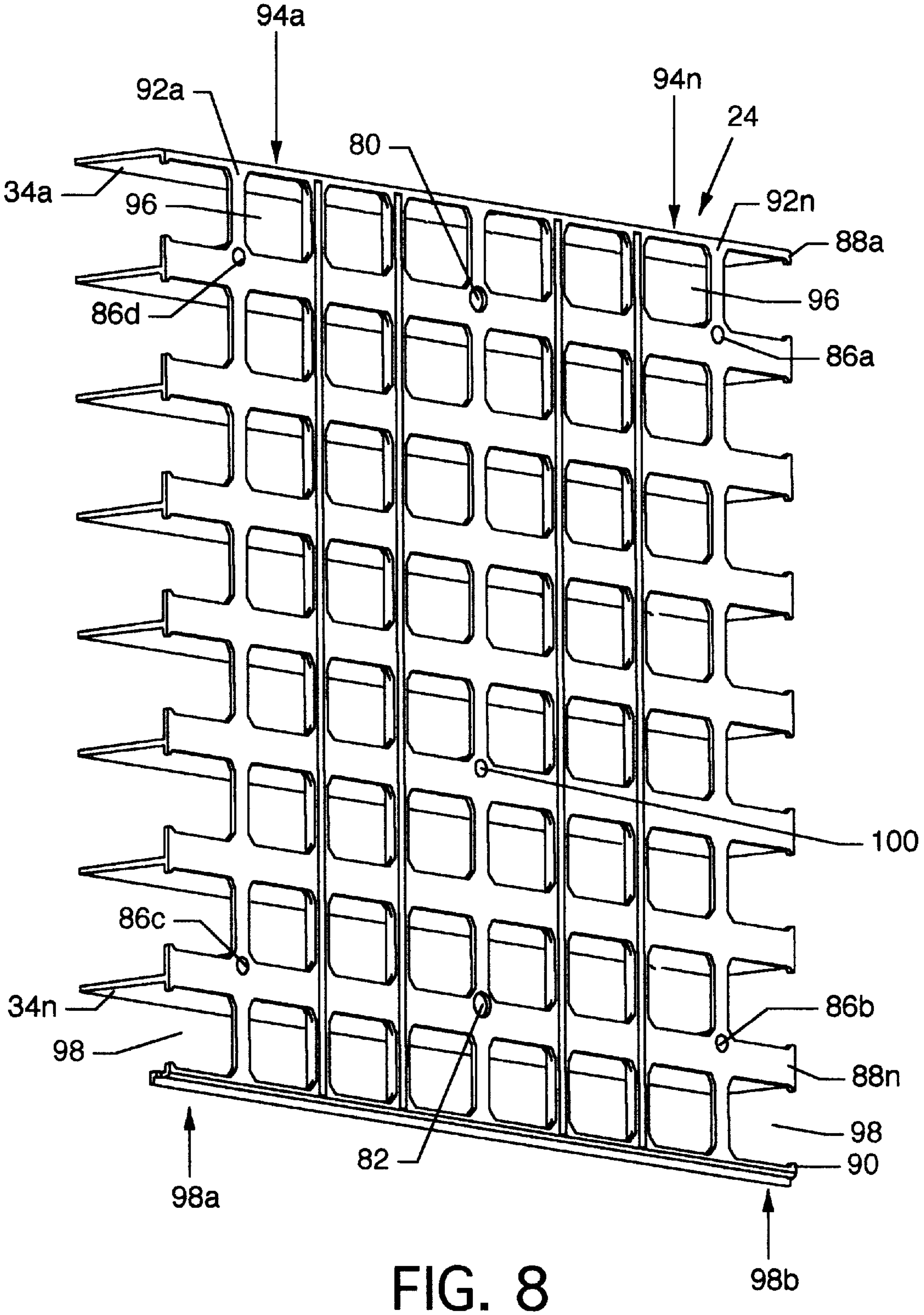
FIG. 8 illustrates a rear isometric view of the louver panel.

FIG. 4 illustrates a semi-exploded isometric view of the modular display 14b from the rear, where all numerals correspond to those elements previously described. The backsides of the rows and columns of pixel lenses 32a–32n are illustrated in snapping engagement with lens mounting holes in the rear panel 30 of the louver panel 24. These holes and other alignment holes are later described in detail in FIG. 8. The housing 16 includes sides 16a, 16b, 16c and 16d, a planar member 16e interrupted by large square access holes 52a–52d, and a plurality of mounting pegs, as later described in detail in FIG. 9. The housing 16 is illustrated having the printed circuit board 18, on which the LED pixels 20a–20n are mounted, aligned to the front face of the housing 16 where the male pin connector strips 46a–46d extend through the large access holes 52a–52d in the housing 16. With reference to both FIG. 4 and FIG. 9, the housing 16 and attached members are now described. Gravity pegs 38a, 38b, 38c and 38d extend outwardly and to the rearward from planar member 16e. Driver board mounting pegs 54a, 54b, 54c and 54d, and rail mounting pegs 58a, 58b, 58c, and 54d extend outwardly and to the rearward from the planar member 16e. An upper latch pad 60 including a through hole 62 aligns on the planar member 16e between the latch mounting pegs 56c and 56d; and a lower latch pad 64, including a through hole 66, aligns on the planar member 16e between the latch mounting pegs 56a and 56b. An upper rail 68, in the form of an elongated angle bracket and having an upper latch pad accommodation cutout, aligns over and about the upper latch pad 60 to the planar member 16e, and over and about the rail mounting pegs 58c and 54d. An upper latch assembly 15 aligns to the upper latch pad 60 and over and about the latch mounting pegs 56*c* and 56*d*. In a similar fashion, a lower rail 70, in the form of an elongated angle bracket, and having a lower latch pad accommodation cutout, aligns over and about the lower latch pad 64 to the planar member 16*e*, and over and about the rail mounting pegs 58*a* and 58*b*. The lower latch assembly 17, being a mirror-like image of the upper latch assembly 15, aligns to the lower latch pad 64 and over and about the latch mounting pegs 56*a* and 56*b*. Through holes 62 and 66 accommodate the upper and lower latch access plugs 26 and 28. Also, the driver board 40, having suitable alignment holes along and about its respective edges, aligns over and about the driver board mounting pegs 54*a*, 54*b*, 54*c* and 54*d*. A plurality of various size twist-on fasteners 67 are secured over and about the driver board mounting pegs 54*a*–54*d*, the latch mounting pegs 56*a*–56*d* and the rail mounting pegs 58*a*–54*d* to secure the upper and lower rails 68 and 70, the upper and lower latch assemblies 15 and 17, and the driver board 40 to the housing 16. It is also noted that similarly constructed upper rail 68 and lower rail 70, in reverse alignment, each include a center mounting hole 72 and opposing slots 74 and 76 which are incorporated to engage the mounting bracket 50 of the power supply 48. A weather stripping 78 comprised of fuzzy material is also included about the sides 16*a*–16*d* of the housing 16 for protection from the elements such as dust, insects and the like. With reference to FIG. 1, it can be seen that the modular display panels 14*a*–14*n* are closely juxtaposed to cause the weather stripping 78 on each modular display panel 14*a*–14*n* to mutually engage the weather stripping 78 of adjacent modular display panels 14*a*–14*n*. A flexible seal 79 of plastic, rubber or other such suitable material aligns adjacent to the weather stripping 78 and about the edges of sides 16*a*–16*d*. Flexible seal 79 seals against the planar surface of the module mounting panel 12 to effect a seal and barrier against dust, moisture, rain and the like. Also illustrated are upper and lower holes 80 and 82 in the louver panel 26 for accommodation of the upper and lower latch access plugs 26 and 28, as also illustrated in FIG. 8, where all numerals correspond to those elements previously described.

Figure 5:
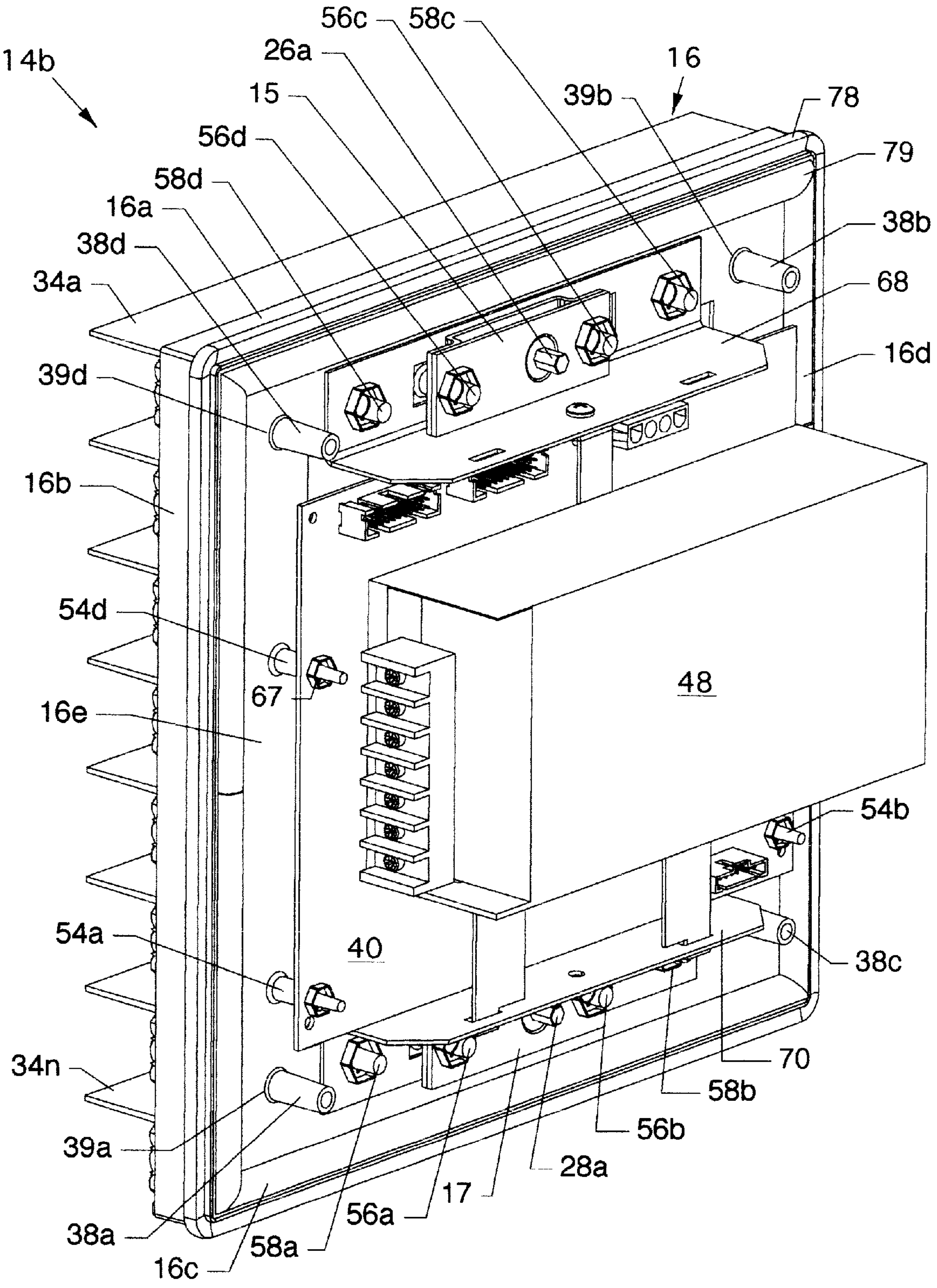
FIG. 5 illustrates the back of an assembled modular display panel.

FIG. 5 illustrates the back of an assembled modular display panel 14*b*, where all numerals correspond to those elements previously described. Illustrated in particular is the rear hexagonal end 26*a* of the upper latch access plug 26 extending through the upper latch assembly 15 for rear access actuation of the latch 29 shown in FIG. 4. The rear hexagonal end 28*a* of the lower latch access plug 28 is also visible extending through the lower latch assembly 17 for actuation of latch 33 shown in FIG. 2.

FIG. 6 illustrates a front isometric view of the housing 16, where all numerals correspond to those elements previously described. Illustrated in particular are the louver mounting posts 22*a*–22*d* and the printed circuit board and louver mounting post 23 which align to corresponding receptacle holes in the louver panel 24, as shown in FIG. 8. Also illustrated are the upper and lower holes 80 and 82 for accommodation of the upper and lower latch access plugs 26 and 28 which extend forward from the planar member 16*e* in a tubular fashion. A plurality of ramped engagement tabs 84*a*–84*n* are visible on the inner surfaces of the sides 16*a* and 16*d* to snappingly engage the edges of the printed circuit board 18 shown in FIG. 3. Ramped engagement tabs similar to ramped engagement tabs 84*a*–84*n* are located on the inner surfaces of sides 16*b* and 16*c* but are not visible in this illustration.

Figure 7:
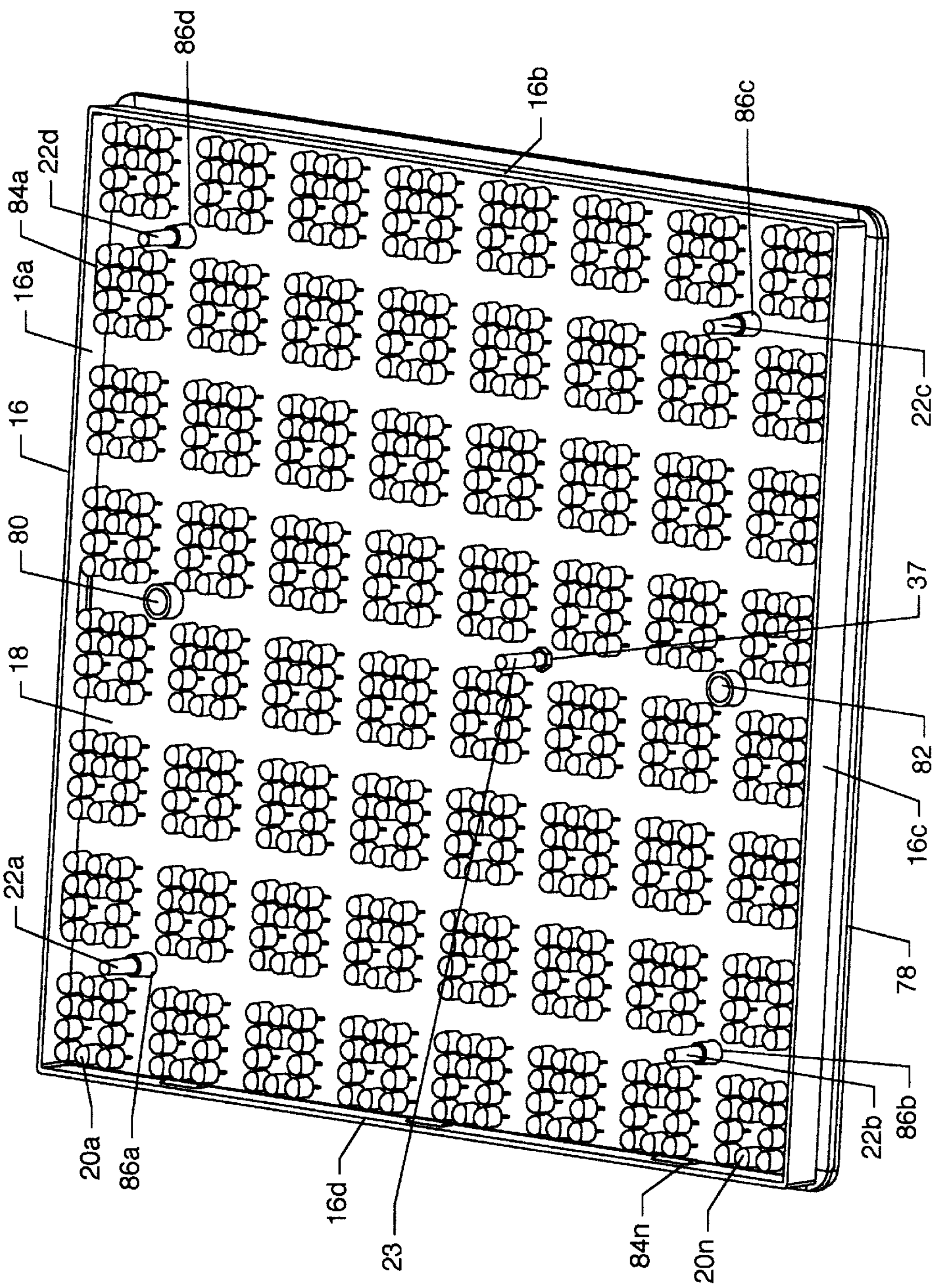
FIG. 7 illustrates a front perspective view of the printed circuit board containing a plurality of LED pixels.

FIG. 7 illustrates a front perspective view of the printed circuit board 18 containing the plurality of LED pixels 20*a*–20*n* aligned to and in engagement with ramped engagement tabs 84*a*–84*n* on the inside surfaces of sides 16*a*–16*d* of the housing 16, where all numerals correspond to those elements previously described. Twist-on fastener 37 secures to the printed circuit board 18 and louver mounting post 23 to assist in securing the printed circuit board 18 to the housing 16. Louver mounting posts 22*a*–22*d* are illustrated extending through alignment holes 86*a*–86*d*, respectively, in the printed circuit board 18.

FIG. 8 illustrates an isometric rear view of the one-piece molded louver panel 24, where all numerals correspond to those elements previously described. The louver panel 24, a multi-dimension gridwork, includes a plurality of horizontally aligned planar members 88*a*–88*n* and a lower configured horizontally aligned member 90 which intersect a plurality of vertically aligned planar members 92*a*–92*n* to form inner columns 94*a*–94*n* of like and similar substantially rectangular four edge lens mounting holes 96 and outer columns 98*a* and 98*b* of lens mounting holes 98 in the same general image and likeness of lens mounting holes 96, but having three edges. Pluralities of pixel lenses 32*a*–32*n*, as shown in FIG. 4, align to and snappingly engage the appropriate lens mounting holes 96 and 98. Also illustrated is a hole 100 which accommodates the printed circuit board and louver mounting post 23 of FIG. 6 and FIG. 7.

Figure 9:
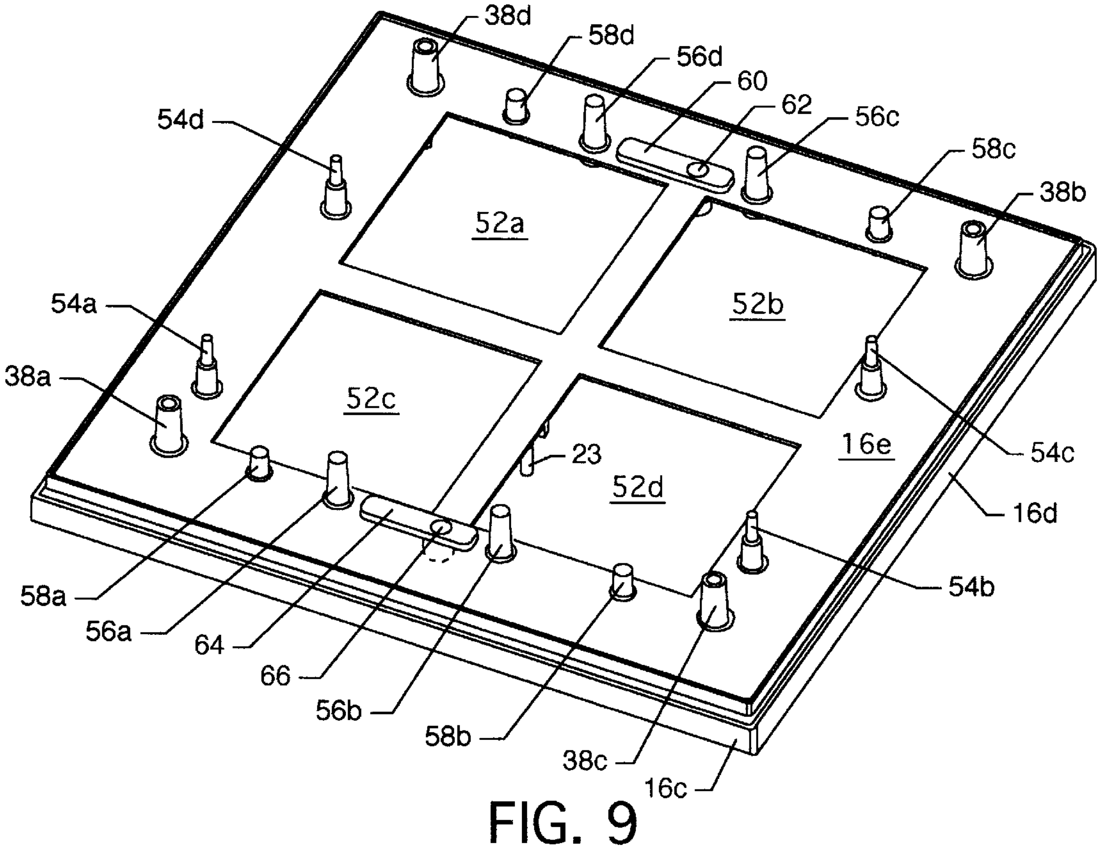
FIG. 9 illustrates a rear isometric view of the housing.

FIG. 9 illustrates a rear isometric view of the housing 16, where all numerals correspond to those elements previously described. Illustrated in particular are the gravity pegs 38*a*–38*d*, rail mounting pegs 58*a*–54*d*, latch mounting pegs 56*a*–56*d*, driver board mounting pegs 54*a*–54*d*, and upper and lower latch pads 60 and 64. Also illustrated are through holes 62 and 66 extending through the upper and lower latch pads 60 and 64, respectively, for accommodation of the upper and lower latch access plugs 26 and 28.

Figure 10:
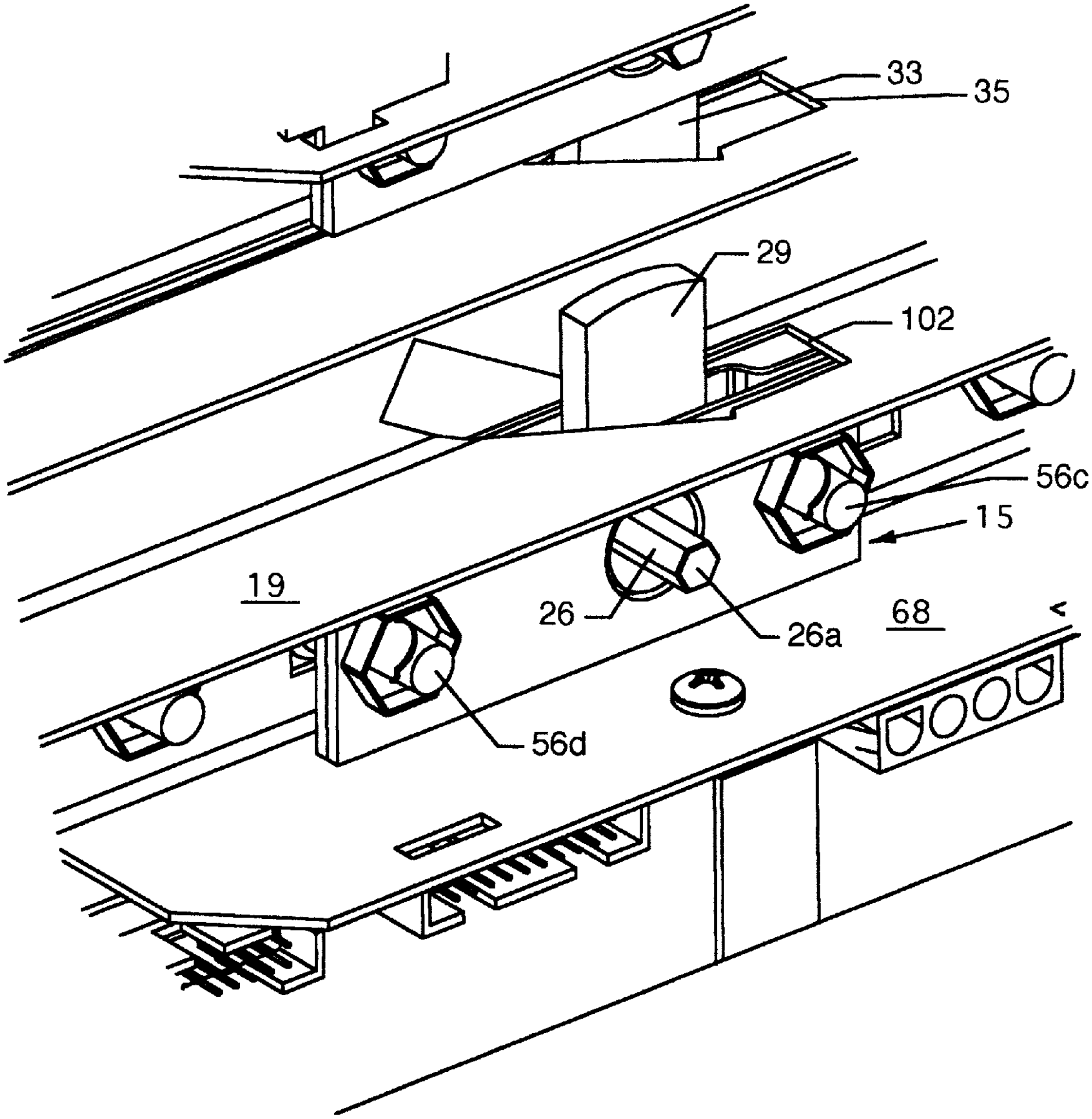
FIG. 10 illustrates an isometric view showing the engagement of an upper latch assembly with a U-shaped channel.

FIG. 10 illustrates an isometric view showing the engagement of an upper latch assembly 15 with the U-shaped member 19 to secure the upper portion of a modular display panel, such as modular display panel 14*c*, to the U-shaped member 19, where all numerals correspond to those elements previously described. Latch 29 is actuated from the rear by applying a nut driver or other suitable tool over the rear hexagonal end 26*a* of the upper latch access plug 26 to rotate the latch 29, which is engaged by the upper latch access plug 26, to engage the slot 102 in the member 19.

Figure 11:
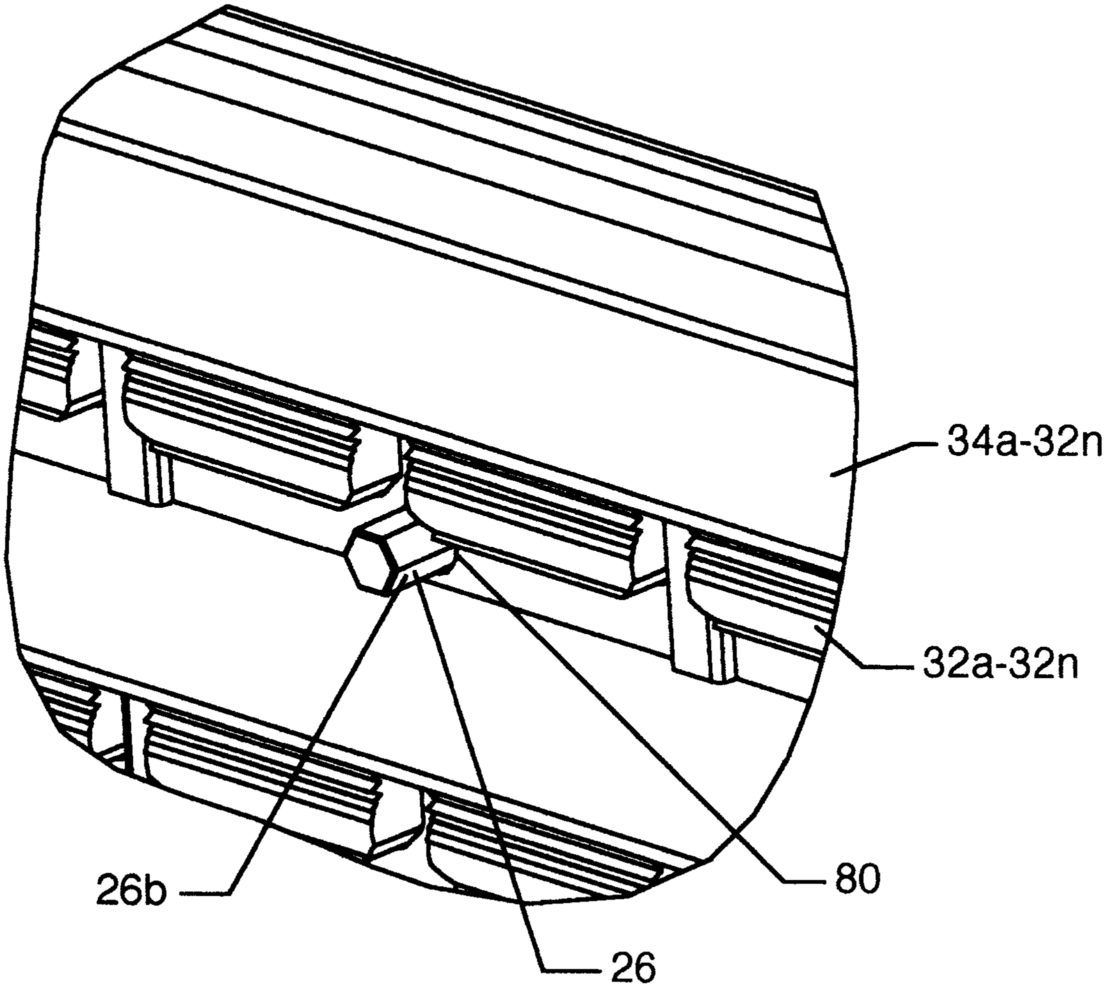
FIG. 11 illustrates accessability from the front of the display system.

FIG. 11 illustrates accessibility from the front of the display system 10, where all numerals correspond to those elements previously described. The front hexagonal end 26*b* of the upper latch access plug 26 extends through hole 80 of the louver panel 24 where it can be actuated by a nut driver or other suitable tool from the front of the display system 10 to rotate the latch 29 so that the modular display panel, such as modular display panel 14*c*, can be removed in conjunction with the actuation of the lower latch access plug 28.

Figure 12:
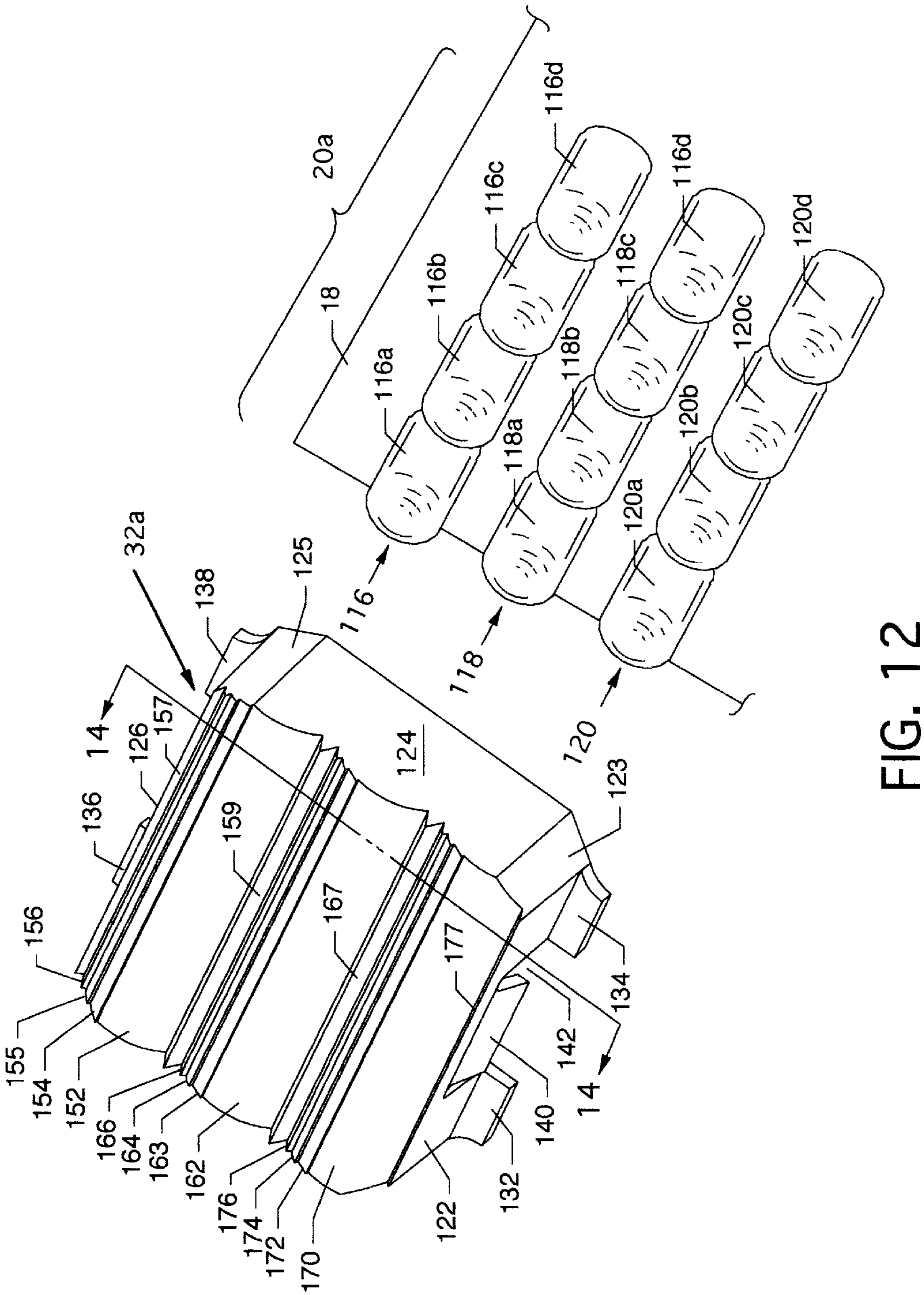
FIG. 12 illustrates a pixel lens in pre-alignment with an LED pixel.
Figure 13:
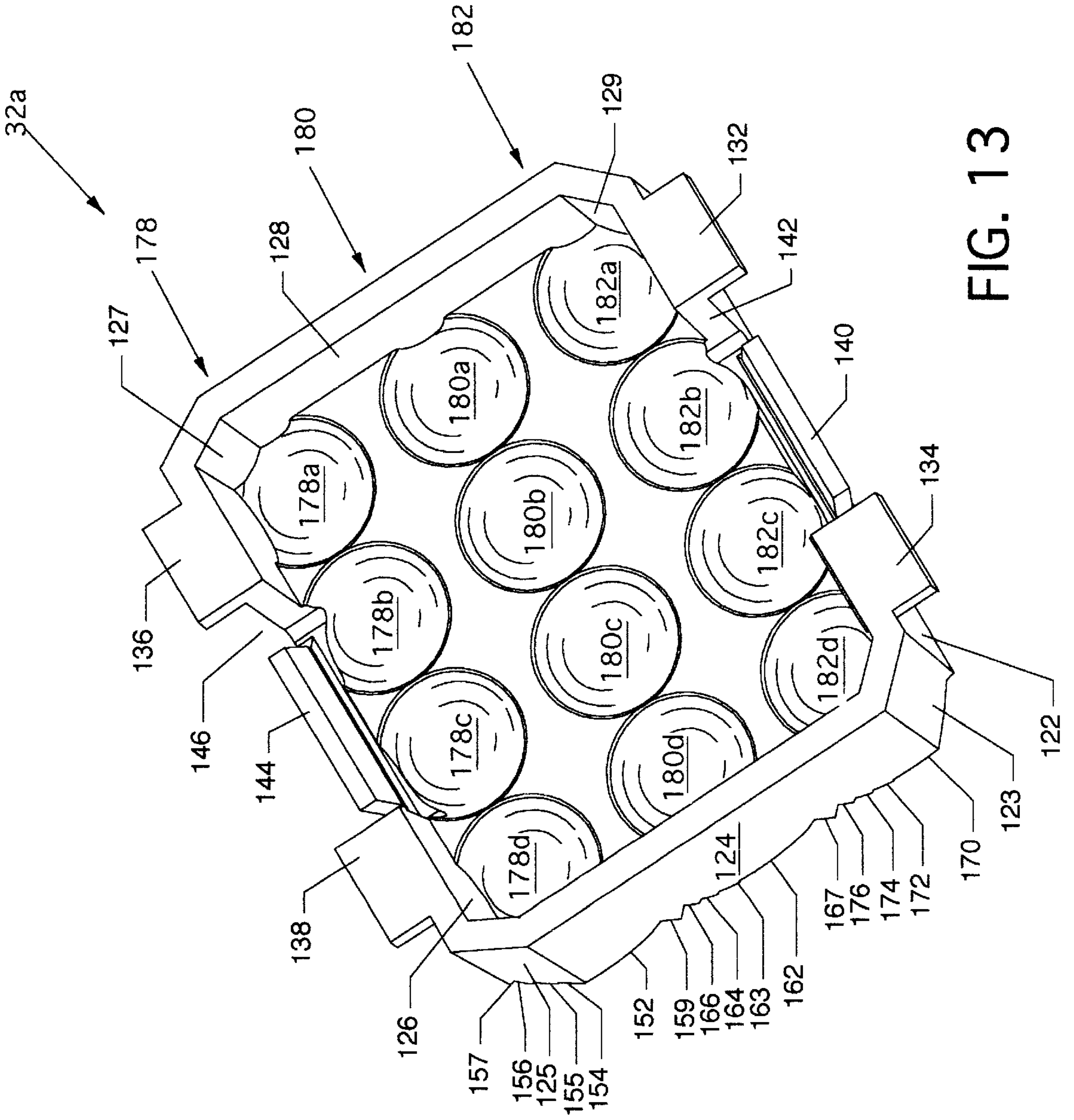
FIG. 13 illustrates a rear isometric view of a pixel lens.
Figure 14:
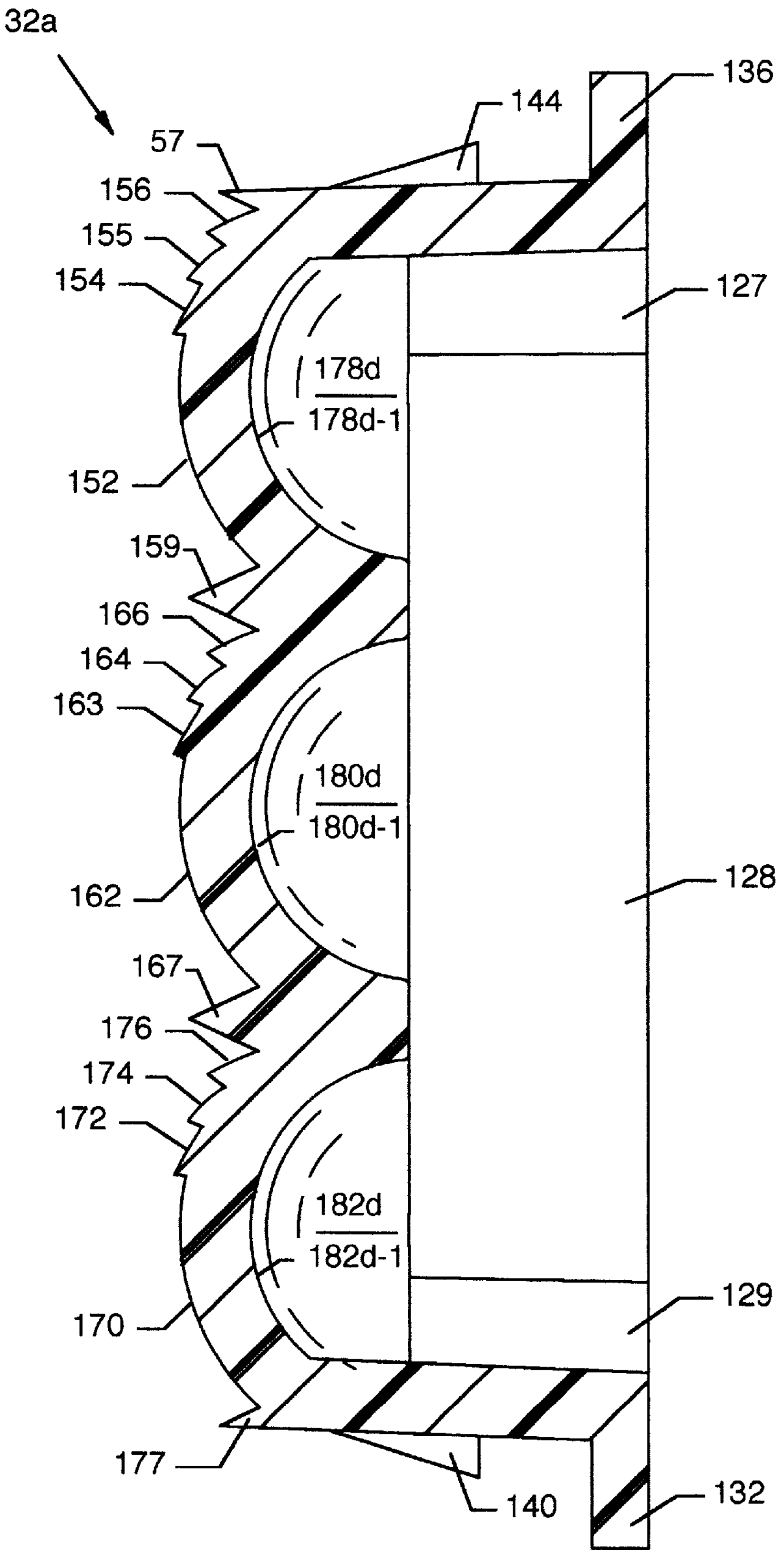
FIG. 14 illustrates a vertical cross-sectional view of a pixel lens along line 14—14 of FIG. 12.

FIG. 12 illustrates a pixel lens 32*a* in pre-alignment with an LED pixel 20*a* mounted on the printed circuit board 18. The pixel lens 32*a* assumes a substantially rectangular shape and is molded or fashioned of clear plastic or other such suitable transparent material which allows light passage. Each LED pixel, such as LED pixel 20*a*, includes an appropriate mix of red, green and blue LED's in a matrix having rows 116, 118 and 120 where each row includes four LED's. Although three rows of four LED's are illustrated, other configurations may be used and shall not be limiting to the scope of the invention. A plurality of LED pixels 20*a*–20*n* accommodate a plurality of pixel lens, such as pixel lens 32*a*, in a modular display panel comprised of, but not limited to, eight columns of eight LED pixels, such as illustrated in FIG. 7. Various lens surfaces of the pixel lens 32*a* direct, focus, refract or otherwise alter light emission from the LED's in the LED pixels 20*a*–20*n* for suitable horizontal viewing along an arc which can range from 70° to 140° and vertical viewing along an arc which can range from 30° to 120° depending on the shape and configuration of the pixel lenses 32*a*–32*n*, as described, various optical qualities of the pixel lenses 32*a*–32*n* can be incorporated to project emitted light in a variety of desirable directions and intensities. With reference to FIG. 12 and FIG. 13, the pixel lens 32*a* is now described. The pixel lens 32*a* includes walls 122, 124, 126 and 128 having interceding chamfered walls 123, 125, 127 and 129. Opposing alignment tabs 132 and 134 extend outwardly from the lower edge of the wall 122 and, correspondingly, opposing alignment tabs 136 and 138 extend outwardly from the lower edge of the wall 126. Alignment tabs 132, 134, 136 and 138 align against the louver panel 24, not illustrated, as later illustrated in detail. A locking tab 140 extends downwardly and outwardly at an angle from a cutout portion 142 of wall 122 and, correspondingly, a locking tab 144 extends downwardly and outwardly at an angle from a cutout portion 146 of wall 126. Locking tabs 140 and 144 engage the louver panel 24, not illustrated, as later described in detail. Located between the upper edges of the walls 122, 124, 126 and 128 and the chamfered walls 123, 125, 127 and 129 is a plurality of lens surfaces for distribution of light transmitted from the LED pixel 20*a*. Extending transversely between wall 128 and wall 124 is a major curved lens surface 152. Also, extending transversely between the chamfered walls 127 and 125 and adjacent to the major curved lens surface 152 is a series of adjacent prisms 154, 155 and 156 which are located at one edge of the major curved lens surface 152, and canted from the curvature of the major curved lens surface 152, as also illustrated in FIG. 14. An upper non-optical ridge 157 having non-curved surfaces extends between chamfered sides 125 and 127 and defines the upper boundary of adjacent prisms 154, 155 and 156; and a lower non-optical ridge 159 having non-curved surfaces extends between sides 124 and 128 and defines the lower boundary of the major curved lens surface 152. The major curved lens surface 152 and the prisms 154, 155 and 156, and a plurality curved lens surface 152 and series of adjacent prisms 154, 155 and 156, align over and about LED row 116. In a related and similarly fashioned manner, another major curved lens surface 162 having a series of adjacent prisms 163, 164 and 166 align transversely between walls 124 and 128. The major curved lens surface 162 and series of adjacent prisms 163, 164 and 166, and a plurality of optically shaped recesses 180*a*–180*d*, which oppose the major curved lens surface 162 and the prisms 163, 164 and 166, align over and about LED row 118. A non-optical ridge 159 having non-curved surfaces defines the boundary between the major curved lens surface 152 and the prism 166. Again, in a related and similarly fashioned manner, a major curved lens surface 170 extends transversely between wall 124 and adjacent chamfered wall 123 and the wall 128 and adjacent chamfered wall 129. A series of adjacent prisms 172, 174 and 176 align transversely between walls 124 and 128. The major curved lens surface 170 and series of adjacent prisms 172, 174 and 176, and a plurality of optically shaped recesses 182*a*–182*d*, which oppose the major curved lens surface 170 and the prisms 172, 174 and 176, align over and about LED row 120. A non-optical ridge 167 having non-curved surfaces extends between sides 124 and 128 and defines the boundary between the major curved lens surface 162 and the prism 176. Another non-optical ridge 177 having non-curved surfaces extends between chamfered sides 123 and 129 to define the lower boundary of the major curved lens surface 170.

FIG. 13 illustrates a rear isometric view of the pixel lens 32*a*, where all numerals correspond to those elements previously described. Illustrated in particular are the backsides of the curved major lens surfaces 152, 162 and 170. Rows 178, 180 and 182 of optically shaped recesses 178*a*–178*d*, 180*a*–180*d* and 182*a*–182*d* corresponding to but and being larger than the upper elongated dome shape of LED's are located and aligned with the rear portion of major curved lens surfaces 152, 162 and 170, and their respective prisms 154, 155, 156, 163, 164, 166, 172, 174 and 176. The rows 178, 180 and 182 of optically-shaped recesses have substantially semi-spherical optically-shaped recesses 178*a*–178*d*, 180*a*–180*d* and 182*a*–182*d* shaped to accommodate upper portion of LED's, such as LED's 116*a*–116*d*, 118*a*–118*d* and 120*a*–120*d*, respectively, as illustrated in FIG. 12, having a cylindrical-like body and an elongated dome-shaped head. Although the recesses are illustrated as semi-spherical for accommodation of LED's with cylindrical-like bodies and elongated dome-shaped heads, other shaped recesses and LED's can be incorporated and shall not be limiting to the scope of the invention.

FIG. 14 illustrates a vertical cross sectional view of the pixel lens 32*a* along line 14—14 of FIG. 12, where all numerals correspond to those elements previously described. Illustrated in particular are the major curved lens surfaces 152, 162 and 170 and their respective prisms 154, 155 and 156; 163, 164 and 166; and 172, 174 and 176. The visible illustrated semi-circular portion of the optically-shaped recesses 178*d*, 180*d* and 182*d* are designated in FIG. 14 as semi-circular rear lens surfaces 178*d* *–1*, 180*d* *–1* and 182*d* *–1*, respectively; and other such semi-circular rear lens surfaces correspondingly oppose the major curved lens surfaces 152, 162 and 170 and their respective prisms 154, 155 and 156; 163, 164 and 166; and 172, 174 and 176 to act as lenses to direct, focus, refract or otherwise alter light emission from the LED pixels, such as pixels 20*a*–20*n*. The semi-circular rear lens surfaces 178*d* *–1*, 180*d* *–1* and 182*d* *–1* direct and intensify LED emitted light, and the corresponding prisms 154, 155, 156, 163, 164, 166, 172, 174 and 176 direct the LED emitted light downwardly to the viewers and away from the louvers so as to use the emitted light more effectively and to direct heat radiation away from the louvers.

Figure 15:
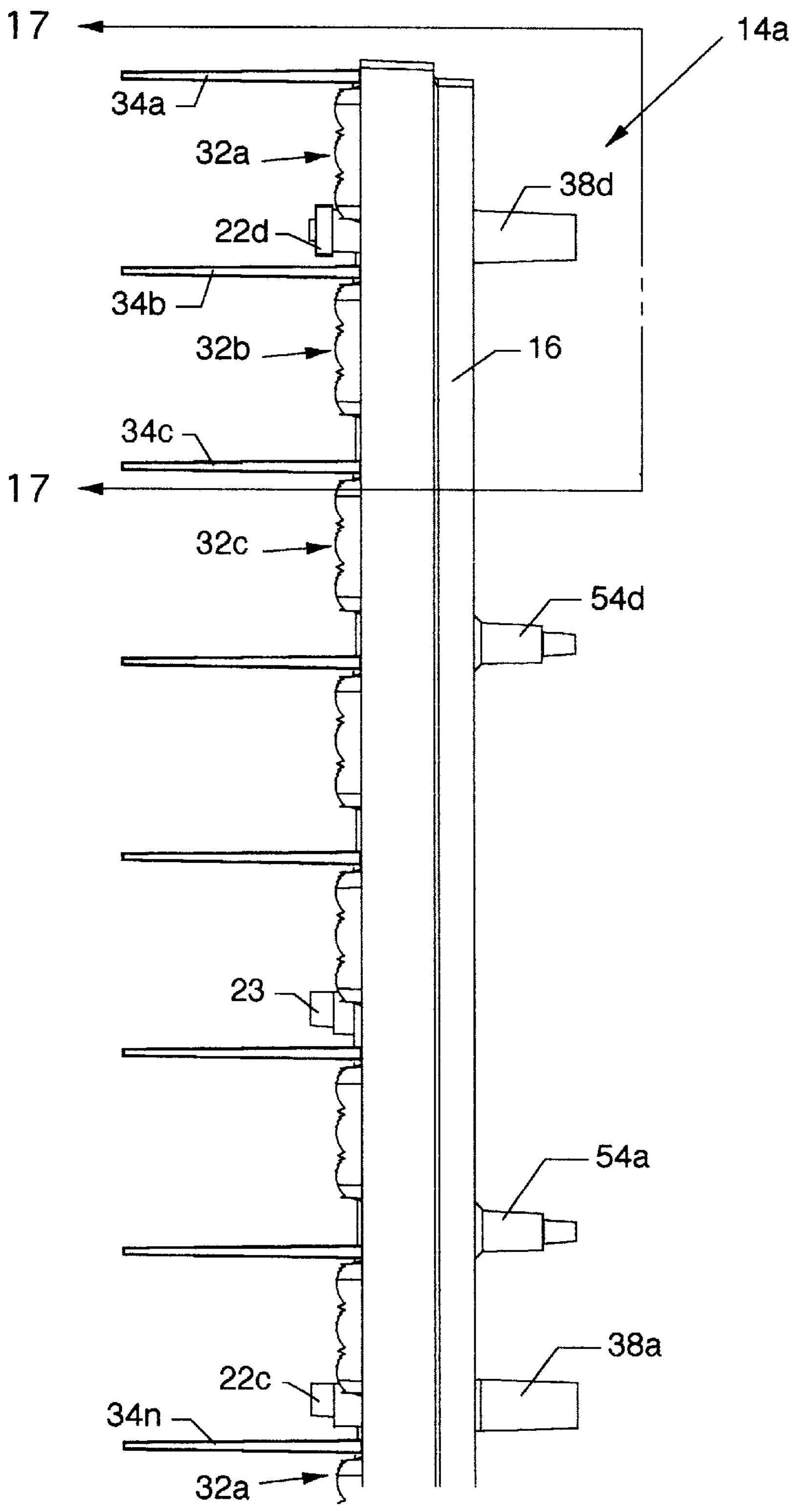
FIG. 15 illustrates a partial side view of a modular display panel.

FIG. 15 illustrates a partial side view of a modular display panel, such as modular display panel 14*a*, where all numerals correspond to those elements previously described. Illustrated in particular is the location of the louvers 34*a*–34*n* for shading of the pixel lenses 32*a*–32*n* from sunlight or other ambient light which may strike the pixel lenses 32*a*–32*n* to interfere with efficient viewing. The louvers 34*a*–34*n*, the pixel lenses 32*a*–32*n*, and associated members may be constructed or otherwise altered to give the desired vertical field of view, as desired.

Figure 16:
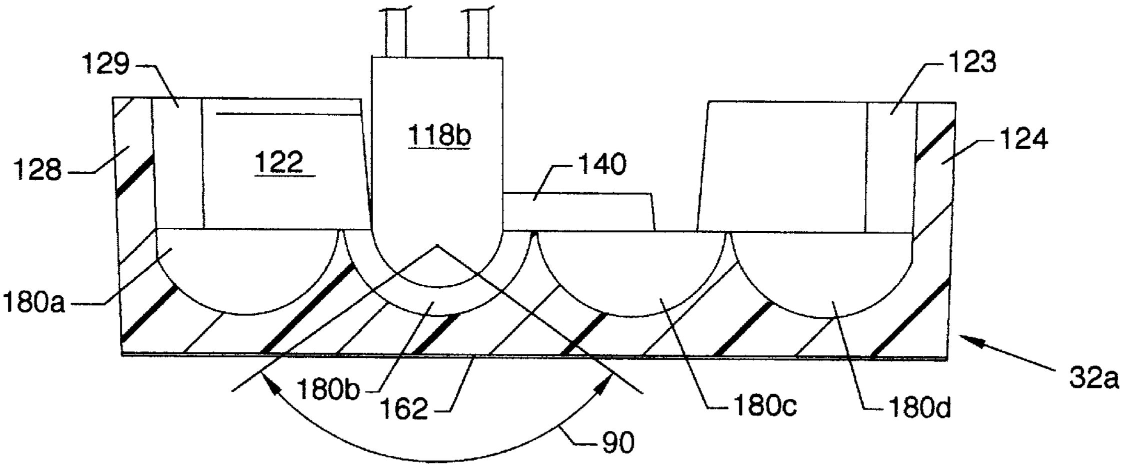
FIG. 16 illustrates a top view of a lens in horizontal cross-section.

FIG. 16 illustrates a top view in horizontal cross section along the mid-section of the pixel lens 32*a*, where all numerals correspond to those elements previously described. The horizontal light emitted by LED 118*b* normally can be viewed at 35° each side of center for a total horizontal viewing field of 70°. The pixel lens 32*a* increases the horizontal field to provide a total horizontal viewing field 190 from 70° to greater than 140°, thereby increasing the viewability of the LED's in the display system 10.

Figure 17:
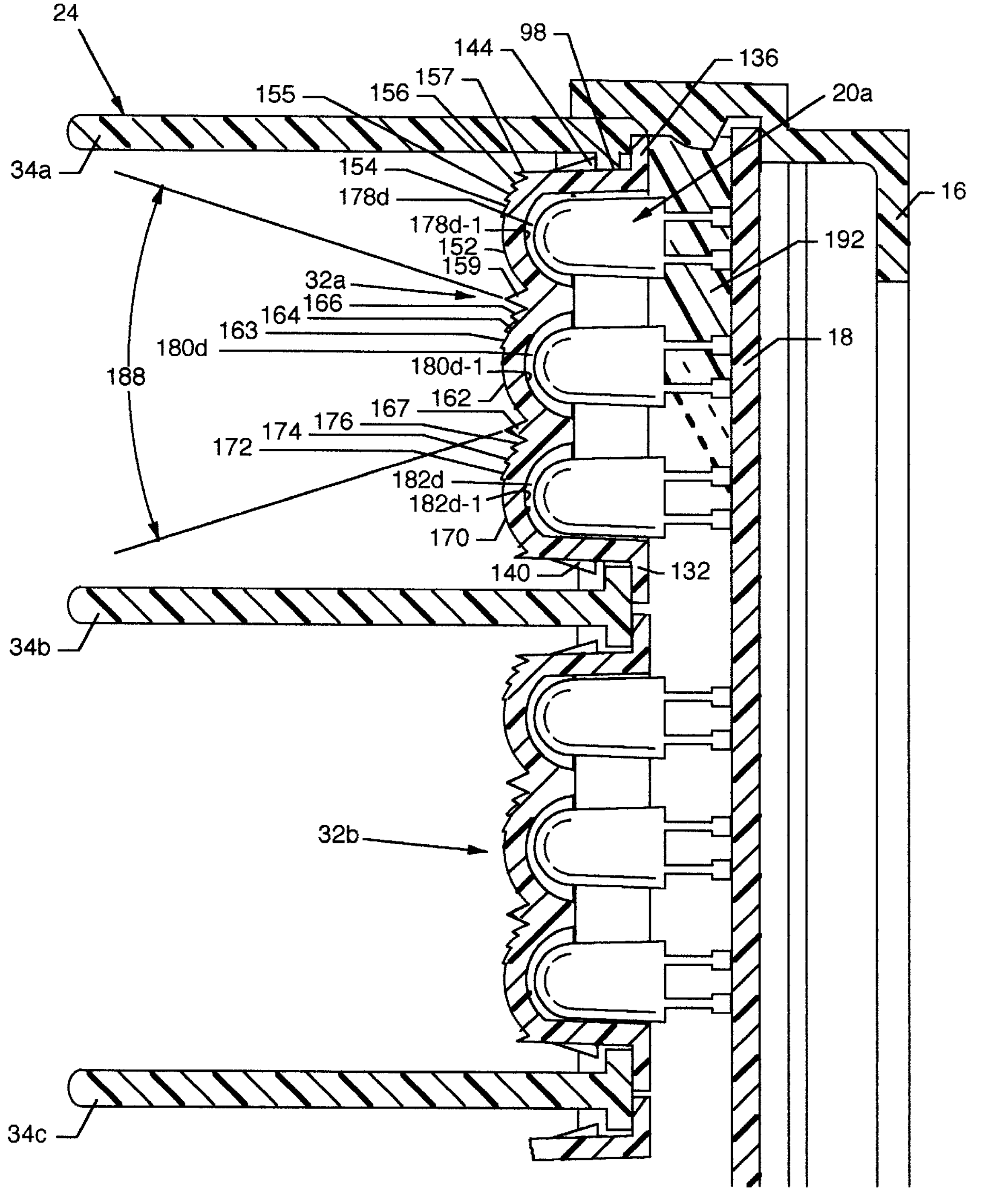
FIG. 17 illustrates a vertical cross-sectional view of the pixel lens along line 17—17 of FIG. 15.

FIG. 17 illustrates a vertical cross sectional view along lines 17—17 of FIG. 15, of the pixel lenses 32*a* and 32*b* where the pixel lenses 32*a* and 32*b* are mounted to the circuit board 18, and where all numerals correspond to those elements previously described. Illustrated in particular is the shading afforded to the pixel lenses 32*a* and 32*b* by the louvers 34*a* and 34*b*. The vertical viewing angle 188 between the sides of ridges 159 and 167, which represents the vertical viewing field, can be, for purposes of illustration and example, 45°, but can be of various angles as required and shall not be deemed to be limiting to the scope of the invention. Louvers 34*a* and 34*b* are incorporated to shade the pixel lenses 32*a* and 32*b* from ambient light, thus preventing interference with light emitted by the LED's to improve contrast. Also illustrated is the engagement of the pixel lens 32*a* in an upper lens mounting hole 98. Locking tabs 140 and 144 snappingly engage the lens mounting hole 98 to secure the pixel lens 32*a* in the mounting hole 98 in alignment with LED pixel 20*a*. Also illustrated is the potting material 192 incorporated to provide proper protection from moisture, dust and corrosion causing elements.

MODE OF OPERATION

Modular display panels 14*a*14*n* are assembled for subsequent attachment to the module mounting panel 12. At the front of the modular display panels 14*a*14*n*, the printed circuit board 18, containing the LED pixels 20*a*–20*n*, is brought into engagement with the housing 16. Pixel lenses 32*a*–32*n* are snap fit to the louver panel 24. The louver panel 24, containing the pixel lenses 32*a*–32*n*, is then aligned to the housing 16 having the printed circuit board 18 and LED pixels 20*a*–20*n*, thereby placing the pixel lenses 32*a*–32*n* in close alignment with the LED pixels 20*a*–20*n*. At the rear of the modular display panels 14*a*–14*n*, upper and lower rails 68 and 70, upper and lower latch assemblies 15 and 17, and the driver card 40, are secured thereto by twist-on removable fasteners, and the power supply is also mounted. Assembled modular display panels 14*a*–14*n* are aligned to the mounting posts of the module mounting panel 12 and secured thereto by the actuating of latches 29 and 33 by a nut driver applied to either end 28*a* or 28*b* of the lower latch access plug 28 and corresponding ends 26*a* or 26*b* of the upper located on the U-shaped member 19 or L-shaped member 25 or other such similar members. Attachment or removal of the modular displays 14*a*–14*n* can be accomplished from either side of the modular display panels 14*a*–14*n*. Disengagement of the modular displays 14*a*–14*n* from the front is accomplished by actuating the latches 29 and 33 from the front by rotating the upper and lower latch access plugs 26 and 28 from the front whereby the modular display panels 14*a*–14*n* simply moved outwardly from the module display panel 12. Disengagement of the modular displays 14*a*–14*n* from the rear is accomplished by actuating the latches 29 and 33 from the rear by rotating the upper and lower latch access plugs 26 and 28 from the rear whereby the modular display panels 14*a*–14*n* are moved outwardly and then rotated and removed to the rearward through the large access holes 52*a*–52*d*. The removal process just described and the use of twist-on connectors to disassemble layers of components provides for quick changeovers of inoperative components, as well as rapid disassembly and reassembly of component members. The pixel lenses 32*a*–32*n* and LED's 116*a*–116*d*, 118*a*–118*d* and 120*a*–120*d* are aligned to focus, distribute, refract or otherwise alter light transmission to a field of view. The LED's 116*a*–116*d*, 118*a*–118*d* and 120*a*–120*d* can be shaped to maximize vertical or horizontal light emission for further enhancement by the pixel lenses 32*a*–32*n*. The pixel lenses 32*a*–32*n* can further modify the vertical or horizontal light emissions from the LED's 116*a*–116*d*, 118*a*–118*d* and 120*a*–120*d* by modifying or changing the curvature of the major curved lens surfaces 152, 162 and 170, the optically-shaped recesses 178*a*–178*d*, 180*a*–180*d*, 182*a*–182*d* or the shape and spacing of the prisms 154, 155, 156, 163, 164, 166, 172, 174 and 176.

Various modifications can be made to the present invention without departing from the apparent scope hereof.

We claim:

1. A display system comprising:

a. a module mounting panel;

b. a plurality of modular display panels in said module mounting panel;

c. a plurality of pixel lens means in said modular mounting panel; and, d. said pixel lens means comprising:

(1) four walls;

(2) a non-optical ridge extending upwardly from first and second, opposing, of said four walls;

(3) a plurality, including first and second, of major curved lens surfaces between said ridges;

(4) non-optical ridges between each of said plurality of lens surfaces;

(5) a plurality of prisms over only said first portion of said lens surfaces; and, (6) optically-shaped recesses for a single light emitting device in the rear portion of each of said lenses.

2. Display of claim 1, wherein each of said modular display panels are accessible from either side of said panel.

3. A pixel lens for an optical display system comprising:

a. four walls;

b. a non-optical ridge extending upwardly from first and second, opposing, of said four walls;

c. a plurality, including first and second portions, of major curved lens surfaces between said ridges;

d. non-optical ridges between each of said lens surfaces;

e. a plurality of linear prisms extending in a straight line over only said first portion of said lens surfaces; and, f. optically-shaped recesses for a single light emitting device in the rear portion of each of said lenses.

4. The display device according to claim 1, wherein said prisms are linear, extending from one wall to another in a straight line fashion.

5. The display device according to claim 2, wherein said prisms are linear, extending from one wall to another in a straight line fashion.

* * * * *